US012739342B2

(12) United States Patent
Murthy et al.

(10) Patent No.: US 12,739,342 B2
(45) Date of Patent: Sep. 15, 2026

(54) METHODS AND CAMERA MONITOR SYSTEMS SUPPORTING MULTIPLE LOW-VOLTAGE DIFFERENTIAL SIGNALING STANDARDS

(71) Applicant: Stoneridge Electronics AB, Solna (SE)

(72) Inventors: Banuprakash Murthy, Novi, MI (US); Troy Otis Cooprider, White Lake, MI (US)

(73) Assignee: STONERIDGE ELECTRONICS AB, Solna (SE)

(*) Notice: Subject to any disclaimer, the term of this patent is extended or adjusted under 35 U.S.C. 154(b) by 0 days.

(21) Appl. No.: 18/919,687

(22) Filed: Oct. 18, 2024

(65) Prior Publication Data

US 2026/0113413 A1 Apr. 23, 2026

(51) Int. Cl.
*H04N 7/01* (2006.01)
*B60R 1/27* (2022.01)
(Continued)

(52) U.S. Cl.
CPC ............. *H04N 7/0132* (2013.01); *G06F 3/14* (2013.01); *H04N 7/183* (2013.01); *H04N 23/11* (2023.01); *H04N 23/74* (2023.01); *H04N 23/76* (2023.01); *B60R 1/27* (2022.01); *B60R 2300/103* (2013.01); *B60R 2300/30* (2013.01)

(58) Field of Classification Search
CPC ...... H04N 7/0132; H04N 7/183; H04N 23/11; H04N 23/74; H04N 23/76; G06F 3/14; B60R 1/27; B60R 2300/103; B60R 2300/30
See application file for complete search history.

(56) References Cited

U.S. PATENT DOCUMENTS 6,254,201 B1 7/2001 Lesesky et al.
6,970,772 B2 11/2005 Radtke et al.
(Continued)

FOREIGN PATENT DOCUMENTS

| | | |
|---|---|---|
| CN | 114155592 | 3/2022 |
| DE | 102018213106 | 2/2020 |
| EP | 3343288 A1 | 7/2018 |

OTHER PUBLICATIONS

Extended European Search Report for European Patent Application No. 25208020.5 dated Mar. 12, 2026.

*Primary Examiner* — Michael Lee
(74) *Attorney, Agent, or Firm* — Carlson, Gaskey & Olds, P.C.

(57) ABSTRACT

A CMS includes a camera mounted to a commercial vehicle. The camera is configured to provide a video feed of an external environment of the commercial vehicle. The CMS includes an electronic control unit (ECU) that includes processing circuitry operatively connected to memory. The processing circuitry is configured to receive the video feed from the camera over a wired interface, and the video feed is serialized. The processing circuitry is configured to deserialize the video feed according to a first low-voltage differential signaling (LVDS) standard based on the video feed being serialized according to the first LVDS standard, and deserialize the video feed according to a second LVDS standard based on the video feed being serialized according to the second LVDS standard. A method for a camera monitor system (CMS) is also disclosed.

18 Claims, 7 Drawing Sheets

(51) Int. Cl.

| | |
|---|---|
| ***G06F 3/14*** | (2006.01) |
| ***H04N 7/18*** | (2006.01) |
| ***H04N 23/11*** | (2023.01) |
| ***H04N 23/74*** | (2023.01) |
| ***H04N 23/76*** | (2023.01) |

(56) References Cited

U.S. PATENT DOCUMENTS

| | | | |
|---|---|---|---|
| 11,618,291 | B2 | 4/2023 | Balton et al. |
| 2016/0014380 | A1 | 1/2016 | Van De Brink |
| 2017/0080861 | A1* | 3/2017 | Vora ........................ H04N 23/51 |
| 2019/0084534 | A1 | 3/2019 | Kasper et al. |
| 2020/0039448 | A1* | 2/2020 | Lu ............................ H04N 7/18 |
| 2020/0338941 | A1 | 10/2020 | Slade et al. |
| 2020/0374152 | A1* | 11/2020 | Ceekala .............. H04L 61/2596 |
| 2022/0083786 | A1* | 3/2022 | Herbst .................. G06V 40/10 |

* cited by examiner

METHODS AND CAMERA MONITOR SYSTEMS SUPPORTING MULTIPLE LOW-VOLTAGE DIFFERENTIAL SIGNALING STANDARDS

TECHNICAL FIELD

This disclosure relates to a camera monitor system (CMS), and more particularly to methods and camera monitor systems that support multiple low-voltage differential signaling standards.

BACKGROUND

Vehicle camera systems for mirror replacement or for supplementing mirror views are utilized in commercial vehicles to enhance the ability of a vehicle operator to see a surrounding environment of the commercial vehicle. These systems are known as "camera monitor systems" (CMS), and they utilize one or more cameras mounted to a commercial vehicle (typical a tractor of the commercial vehicle) to provide an enhanced field of view to a vehicle operator of an area surrounding a trailer of the commercial vehicle. CMS may also include cameras in locations not typically associated with a mirror, such as a rear camera (e.g., a trailer camera) that records images of an area behind a vehicle, a camera that records an area in front of a vehicle, etc. A variety of different cameras may be used in a CMS, which support different communication standards.

SUMMARY

A CMS according to an example embodiment of the present disclosure includes a camera mounted to a commercial vehicle. The camera is configured to provide a video feed of an external environment of the commercial vehicle. The CMS includes an electronic control unit (ECU) that includes processing circuitry operatively connected to memory. The processing circuitry is configured to receive the video feed from the camera over a wired interface, and the video feed is serialized. The processing circuitry is configured to deserialize the video feed according to a first low-voltage differential signaling (LVDS) standard based on the video feed being serialized according to the first LVDS standard, and deserialize the video feed according to a second LVDS standard based on the video feed being serialized according to the second LVDS standard.

In a further embodiment of the foregoing embodiment, the processing circuitry is configured to determine whether the camera utilizes the first LVDS standard or the second LVDS standard based on data received from the camera.

In a further embodiment of any of the foregoing embodiments, the processing circuitry is configured to determine whether the camera utilizes the first LVDS standard or a second LVDS standard based on the video feed that is serialized.

In a further embodiment of any of the foregoing embodiments, the first LVDS standard and the second LVDS standard are each Flat Panel Display (FPD) Link standards.

In a further embodiment of any of the foregoing embodiments, the first LVDS standard includes FPD-Link III, and the second LVDS standard includes FPD-Link IV.

In a further embodiment of any of the foregoing embodiments, the processing circuitry is configured to perform an analysis of the video feed; determine, based on the analysis, a parameter adjustment for the camera to utilize for adjustment of the video feed; and transmit an instruction to implement the parameter adjustment to the camera as part of a closed loop control architecture.

In a further embodiment of any of the foregoing embodiments, the parameter adjustment includes a digital gain adjustment that instructs the camera to adjust pixel intensity values of the video feed.

In a further embodiment of any of the foregoing embodiments, the parameter adjustment includes an integration time adjustment that instructs the camera to adjust an integration time of the video feed.

In a further embodiment of any of the foregoing embodiments, the analysis includes determination, based on one or more criteria, of whether the video feed is underexposed or overexposed. The processing circuitry is configured to, based on the analysis indicating that the video feed is overexposed, select the parameter adjustment to instruct the camera to do one or more of the following: reduce an integration time of the video feed, reduce a digital gain of the video feed, increase a frame rate of the video feed. The processing circuitry is configured to, based on the analysis indicating that the video feed is underexposed, select the parameter adjustment to instruct the camera to do one or more of the following: increase the integration time of the video feed, increase the digital gain of the video feed, reduce the frame rate of the video feed.

In a further embodiment of any of the foregoing embodiments, the camera is an RGB-IR camera, and the processing circuitry is configured to, based on the camera including an infrared illumination source, instruct the camera to utilize the infrared illumination source to record images at night. The processing circuitry is configured to, based on the camera not including an infrared illumination source, instruct the camera to increase a brightness of the video feed at night without reliance on an infrared illumination source for the camera.

A method for a CMS according to an example embodiment of the present disclosure includes receiving, at an ECU of the CMS, and over a wired interface, a video feed from a camera. The video feed is serialized. The method includes deserializing, by the ECU, the video feed according to a first LVDS standard based on the video feed being serialized according to the first LVDS standard; and deserializing, by the ECU, the video feed according to a second LVDS standard based on the video feed being serialized according to the second LVDS standard.

In a further embodiment of the foregoing embodiment, the method includes determining whether the camera utilizes the first LVDS standard or the second LVDS standard based on data received from the camera.

In a further embodiment of any of the foregoing embodiments, the method includes determining whether the camera utilizes the first LVDS standard or the second LVDS standard based on the video feed that is serialized.

In a further embodiment of any of the foregoing embodiments, the first LVDS standard and the second LVDS standard are each FPD-Link standards.

In a further embodiment of any of the foregoing embodiments, the first LVDS standard includes FPD-Link III, and the second LVDS standard includes FPD-Link IV.

In a further embodiment of any of the foregoing embodiments, the method includes analyzing the video feed, determining a parameter adjustment for the camera to utilize for adjustment of the video feed based on the analyzing, and transmitting an instruction to the camera to implement the parameter adjustment as part of a closed loop control architecture.

In a further embodiment of any of the foregoing embodiments, the parameter adjustment includes a digital gain adjustment that instructs the camera to adjust pixel intensity values of the video feed.

In a further embodiment of any of the foregoing embodiments, the parameter adjustment includes an integration time adjustment that instructs the camera to adjust an integration time of the video feed.

In a further embodiment of any of the foregoing embodiments, the analyzing includes determining, based on one or more criteria, whether the video feed is underexposed or overexposed. The method includes, based on the analyzing indicating that the video feed is overexposed, selecting the parameter adjustment to instruct the camera to do one or more of the following: reduce an integration time of the video feed, reduce a digital gain of the video feed, increase a frame rate of the video feed. The method also includes, based on the analysis indicating that the video feed is underexposed, selecting the parameter adjustment to instruct the camera to do one or more of the following: increase the integration time of the video feed, increase the digital gain of the video feed, reduce the frame rate of the video feed.

In a further embodiment of any of the foregoing embodiments, the camera is an RGB-IR camera and the method includes, based on the camera including an infrared illumination source, instructing the camera to utilize the illumination source to record images at night. The method also includes, based on the camera not including an infrared illumination source, instructing the camera to increase a brightness of the video feed at night without reliance on an infrared illumination source for the camera.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The disclosure can be further understood by reference to the following detailed description when considered in connection with the accompanying drawings wherein.

DETAILED DESCRIPTION

Figure 1:
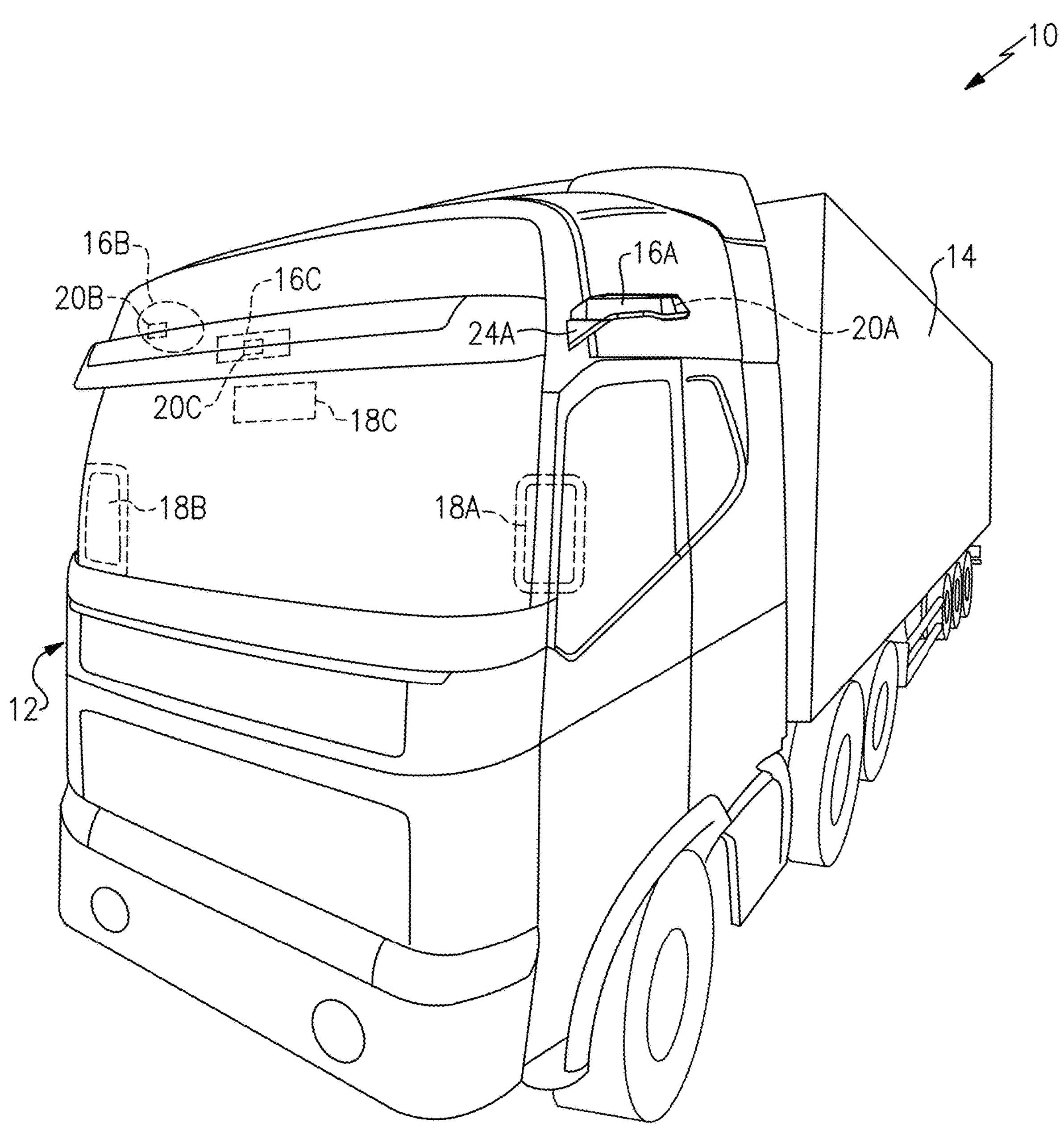
FIG. 1 is a schematic front perspective view of an example commercial vehicle with a camera mirror system (CMS) used to provide at least Class II and Class IV views.
Figure 2:
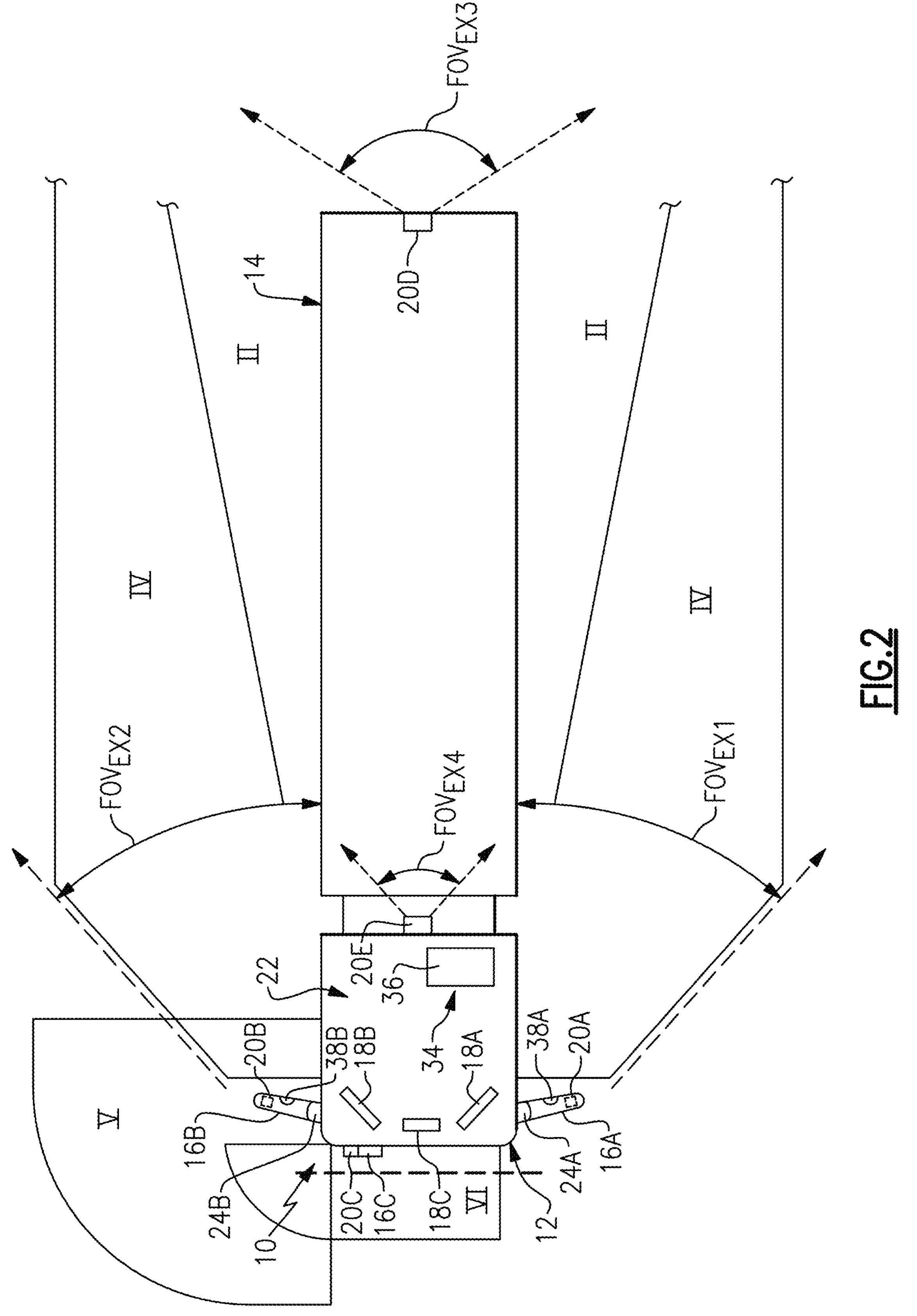
FIG. 2 is a schematic birds-eye view of the commercial vehicle of FIG. 1.

A schematic view of a commercial vehicle 10 is illustrated in FIGS. 1-2. The vehicle 10 includes a vehicle cab or "tractor" 12 for pulling a trailer 14. Although the vehicle 10 is depicted as a commercial truck in this disclosure, it is understood that other types of vehicles may be used, and it should be understood that other configurations may be utilized for the vehicle cab 12 and/or trailer 14 (e.g., different types or quantities of trailers).

Referring now to FIGS. 1 and 2, camera arms 16A-B each include a respective base 24A-B that is secured to, for example, the tractor 12. The pivoting camera arms 16A-B are supported by the respective bases 24A-B and may articulate relative thereto. At least one rearward facing camera 20A-B is arranged respectively on or within the camera arms 16A-B. The exterior cameras 20A-B respectively provide an exterior field of view $FOV_{EX1}$, $FOV_{EX2}$ that each include at least one of Class II and Class IV views (see FIG. 2), which are legally prescribed views in the commercial trucking industry. Although rotatable camera arms 16 are depicted, it is understood that this is a non-limiting example and that non-rotatable camera arms may be used.

The Class II view on a given side of the commercial vehicle 10 is a subset of the class IV view of the same side of the commercial vehicle 10. Multiple cameras also may be used in each camera arm 16A-B to provide these views, if desired. Class II (narrow) and Class IV (wide angle) views are defined in European R46 legislation, for example, and the United States and other countries have similar drive visibility requirements for commercial trucks. Any reference to a "Class" view is not intended to be limiting, but is intended as an example of the type of view provided to a display from a particular camera.

Each camera arm 16A-16B may also provide a housing that encloses electronics, e.g., a controller, that are configured to provide various features of the CMS 15. The camera arms 16A-B may be mounted either at a roof-mount location over the cab door (as shown in FIG. 1), or on a door-mounted bracket or station, for example. If desired, the camera arms 16A-B may include conventional mirrors integrated with them as well, although the CMS 15 may be used to entirely replace mirrors. In additional examples, each side can include multiple camera arms, with each arm housing one or more cameras and/or mirrors.

If video of Class V and/or Class VI views is also desired, a camera housing 16C and camera 20C may be arranged at or near the front of the commercial vehicle 10 to provide those views (FIG. 2).

A backup camera 20D may be provided which provides a field of view $FOV_{EX3}$. The backup camera 20D may be mounted at a top/centerline of the trailer, at a bumper/bed level of the trailer, or at a top-corner of the back of the trailer, for example. Alternatively, or in addition to the rear trailer camera, a "fifth wheel camera" 20E may be provided that is mounted to a rear of the tractor 12 and that provides a field of view $FOV_{EX4}$. The fifth wheel camera 20E may be mounted anywhere between the lateral plane of the fifth wheel fixture and the top/roof edge of the tractor, for example.

Optionally, an infrared (IR) illumination source 38A-B may be provided in one or both of the camera arms 16A-B to provide IR illumination for IR images (as shown in FIG. 2).

Figure 3:
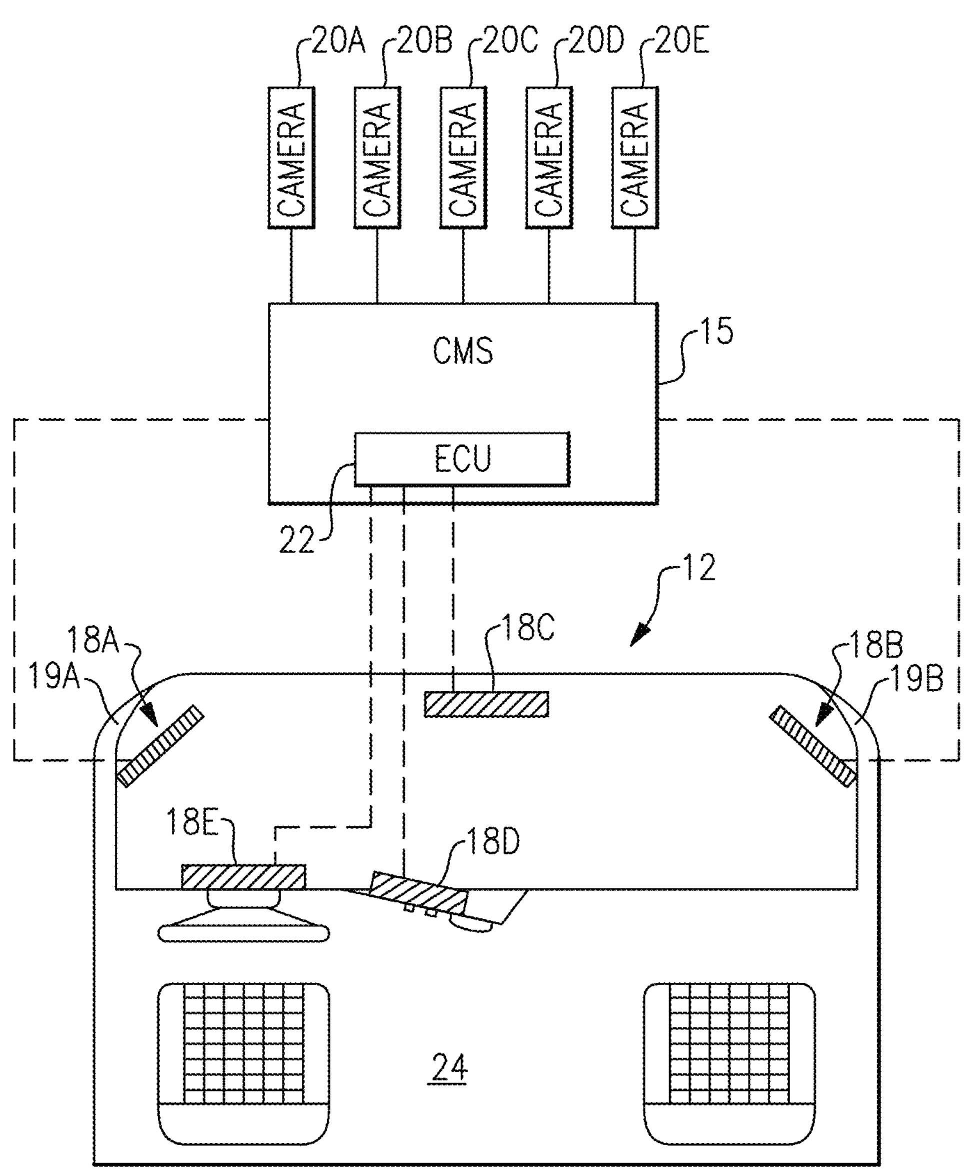
FIG. 3 is a schematic top view of an example vehicle cabin interior.
Figure 4:
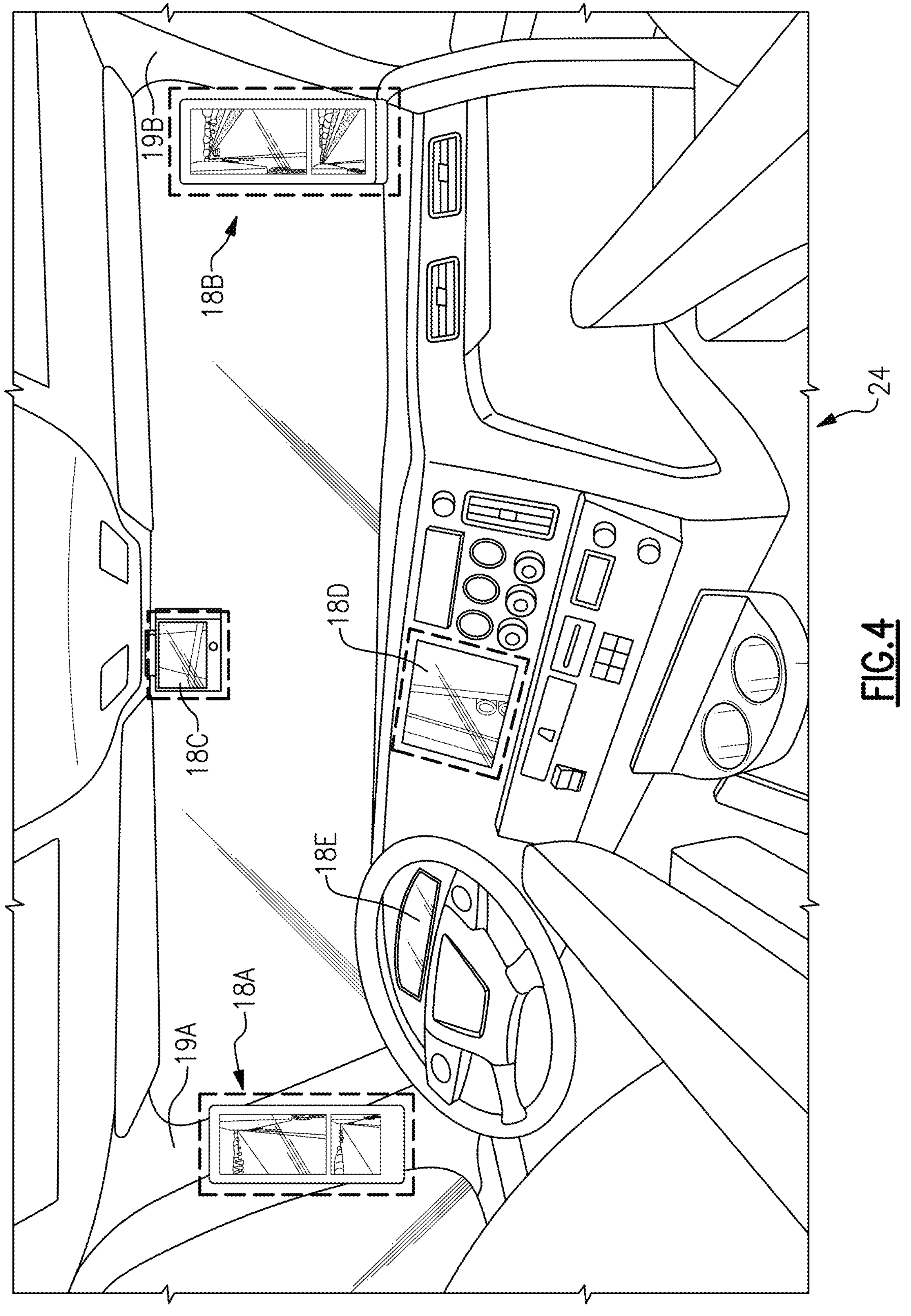
FIG. 4 is a schematic perspective view of the example vehicle cabin interior.

FIG. 3 is a schematic top view of an example vehicle cabin interior 26, and FIG. 4 is a perspective view of the vehicle cabin interior 24. Referring now to FIGS. 3-4 with continued reference to the preceding figures, electronic displays 18A-E (e.g., which may be video displays, such as LCD displays) and cameras 20A-E are shown. The various electronic displays 18A-E and cameras 20A-E are part of a camera monitor system (CMS) 15, and therefore act as CMS displays and CMS cameras. As used herein, a "CMS camera" 20 is a camera configured to record images of an environment surrounding a commercial vehicle 10, and a "CMS display" 18 is an electronic display (e.g., an LCD) that is configured to display image feeds from those cameras.

The CMS 15 includes a CMS electronic control unit (ECU) 22 that acts as a controller and includes processing circuitry that supports operation of the CMS 15. The CMS ECU 22 is operatively connected to memory (which may include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). The processing circuitry may include one or more microprocessors, microcontrollers, application specific integrated circuits (ASICs), or the like.

The ECU 22 is configured to be compatible with a variety of different cameras, including, e.g., cameras with different resolutions (e.g., 3-8 megapixels), cameras that utilize different communication standards, and cameras that include or omit IR illumination.

The CMS displays 18A-B are arranged on each of the driver and passenger sides within the vehicle cab 12 on or near the A-pillars 19A-B to display Class II and Class IV views on its respective side of the commercial vehicle 10, which provide rear facing side views along the commercial vehicle 10 that are captured by the exterior cameras 20A-B.

As discussed above, if video of Class V and Class VI views are also desired, the camera housing 16C and camera 20C may be arranged at or near the front of the commercial vehicle 10 to provide those views (FIG. 2). In the example of FIG. 3, additional displays 18C-E are provided. Display 18C is arranged in the vehicle cabin interior 26 near the top center of the windshield and may be used to display the Class V and Class VI views, which are toward the front of the commercial vehicle 10, or a backup camera view (from camera 20D or 20E) to the driver. Display 18D is provided in a center console area of the vehicle cabin interior 26, and may be used for other purposes, such as navigation, infotainment, etc. Display 18E may be part of an instrument cluster, for example. The displays 18A-E face a driver region within the vehicle cabin interior 26 where an operator is seated on a driver seat.

Figure 5:
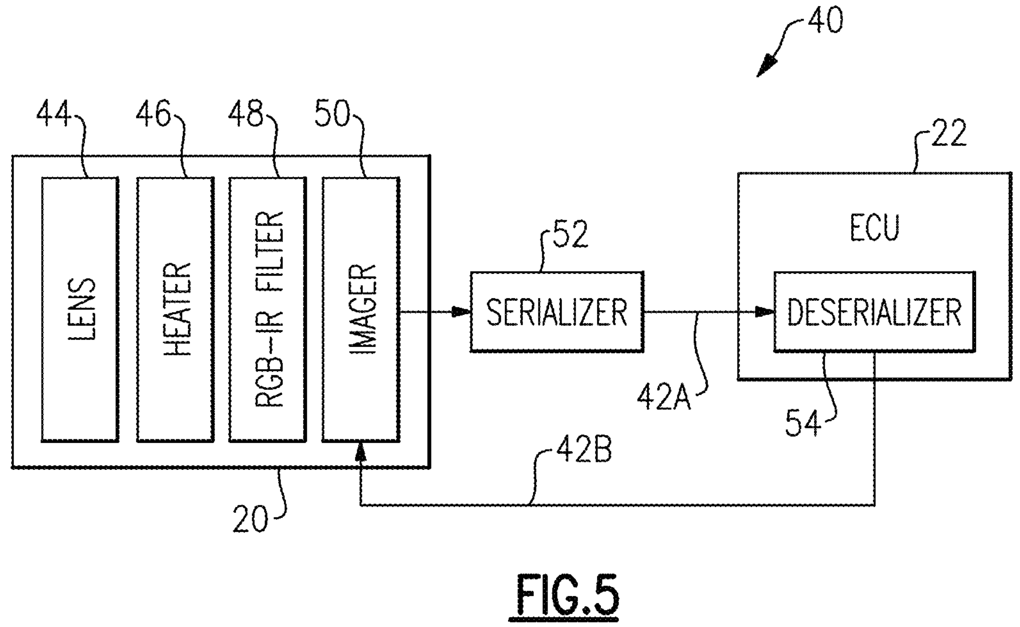
FIG. 5 schematically illustrates an example closed loop CMS control architecture.

FIG. 5 schematically illustrates an example closed loop CMS control architecture 40 which facilitates communication between camera 20 and ECU 22 over wired communication channels 42A-B. In one or more embodiments, communication over channel 42A is unidirectional from the camera 20 to the ECU 22, and communication over channel 42B is bidirectional between the camera 20 and ECU 22. Although depicted as being separate from each other, in one or more embodiments the communication channels 42A-B utilize the same wiring. The communication channels 42A-B may utilize twisted pair or coaxial cable wiring, for example.

In the example of FIG. 5, the camera 20 includes a lens 44, a heater 46, a RGB-IR filter 48, and an imager 50. The heater 46 may be used to mitigate frost and/or condensation on the lens 44. The imager 50 includes an imaging sensor for recording image data of a scene visible through the lens 44. The RGB-IR filter 48 will be discussed in more detail below in connection with FIG. 6.

Referring still to FIG. 5, a serializer 52 serializes a video feed of image data from the camera 20 and transmits it over communication channel 42A. The serializing process involves separating the image data from the imager 50 into segments (e.g., packets or frames) which include image data and may also include clock bits.

The ECU 22 includes a deserializer 54 that is configured to deserialize the data segments received from the serializer 52, and reconstruct the video data from the camera 20. The deserializer 54 is configured to deserialize according to a plurality of low-voltage differential signaling (LVDS) communication standards. LVDS refers to the use of differential signaling to reduce noise and emissions.

FPD-Link, which utilizes LVDS, a multi-protocol physical-layer technology that aggregates data from various industry-standard protocols and transfers it over cables. There are multiple versions of FPD-Link, including FPD-Link III and FPD-Link IV.

The number of bits in a given segment, the encoding used, and the signal frequency vary between different LVDS communication standards. For example, the FPD-Link III standard utilizes a bandwidth of 4 Gbps and the FPD-Link IV standard utilizes a bandwidth of 7 Gbps.

The ECU 22 analyzes image data from the video feed, and sends instructions to the camera over communication channel 42B to perform parameter adjustments, such as: adjusting a frame rate, adjusting an integration time, and/or adjusting pixel brightness (e.g., as digital gain) of the video feed. The system is "closed loop" in the sense that the ECU 22 is configured to make adjustments based on real-time feedback, iterating through multiple rounds of feedback until the ECU 22 achieves its desired result (e.g., a desired image brightness).

Figure 6:
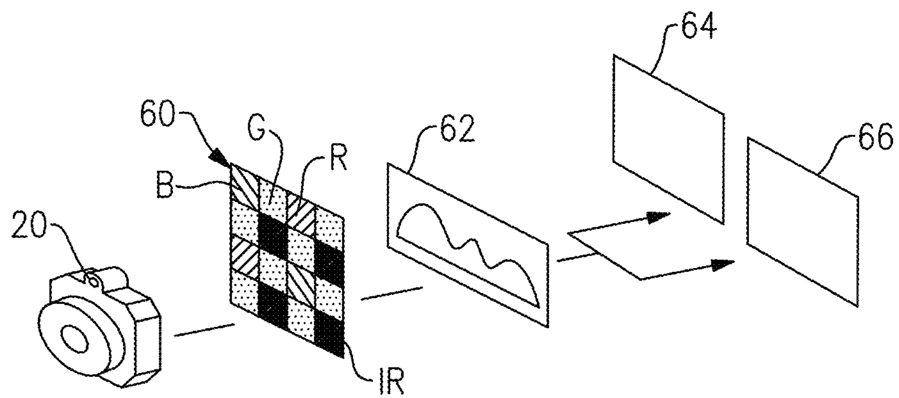
FIG. 6 schematically illustrates an example RGB-IR camera.

FIG. 6 schematically illustrates an example RGB-IR camera, generically shown as 20, which includes a color filter array (CFA) 60 which is able to determine pixels for both infrared (IR) light, which is not visible to the naked human eye, and also visible non-IR light. The RGB-IR camera 20 performs RGB-IR processing (schematically shown at 62) in order to output RGB image data 64 and IR image data 66.

Figure 7A:
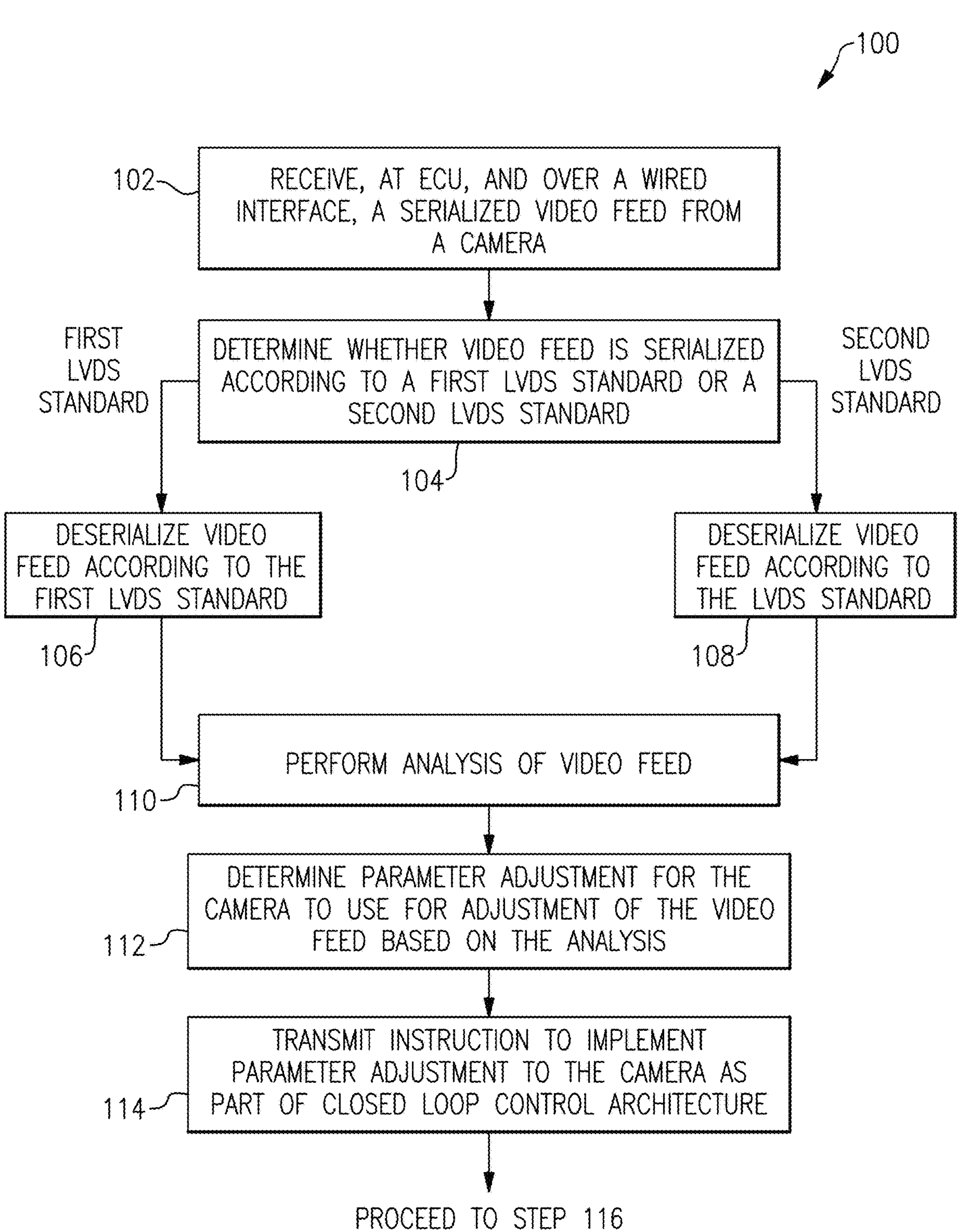
FIGS. 7A-B depict a flowchart of an example method for a CMS.
Figure 7B:
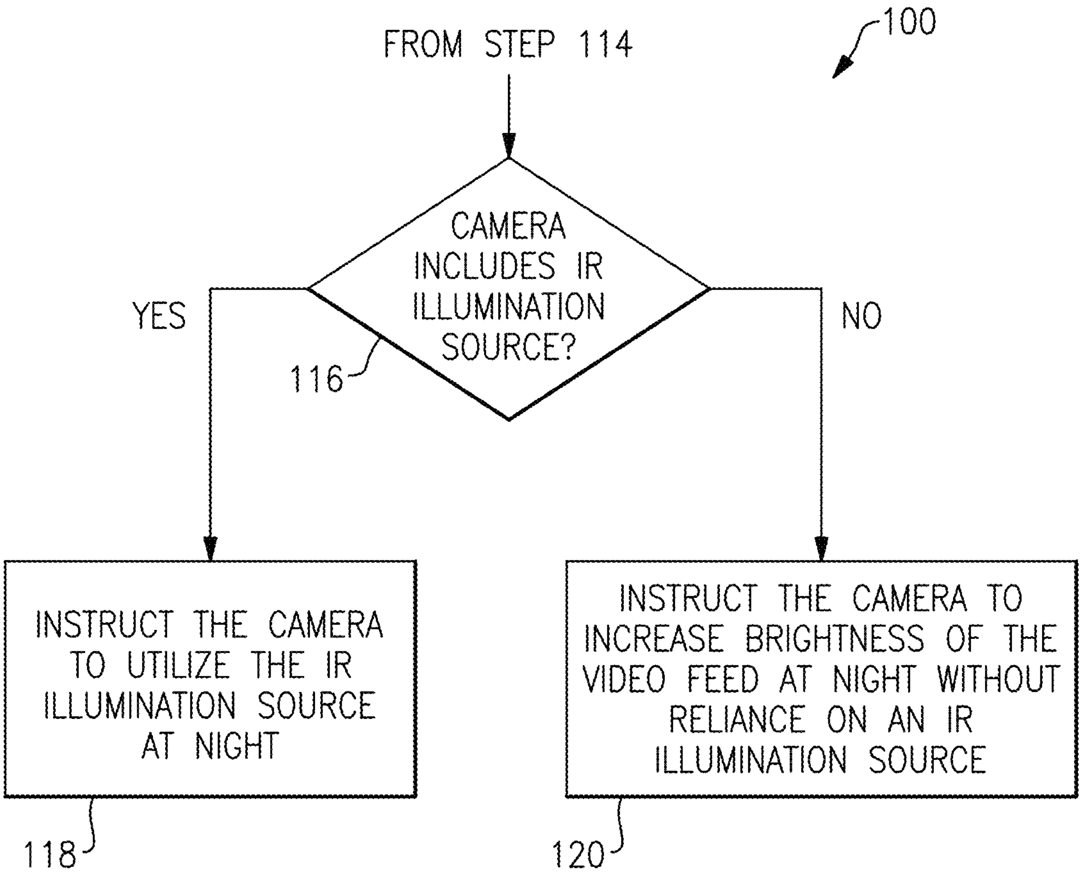

FIGS. 7A-B depict a flowchart of an example method 100 for a CMS. The method 100 may be performed by ECU 22, for example. The ECU 22 receives over a wired interface (communication channel 42A) a serialized video feed from camera 20 (step 102). The ECU 22 determines whether the video feed is serialized according to a first LVDS standard (e.g., FPD-Link III) or a second LVDS standard (e.g., FPD-Link IV) (step 104).

In one or more embodiments, the first LVDS standard and the second LVDS standard are each Flat Panel Display (FPD) Link standards (e.g., one is FPD-Link III and the other is FPD-Link IV).

In one or more embodiments, the ECU 22 determines whether the serializer 52 uses the first or second LVDT standard based on pre-saved configuration data on the ECU 22 (e.g., programmed by an installer).

In one or more embodiments, the ECU 22 determines whether the serializer 52 uses the first or second LVDT standard based on data received from the camera 20 (e.g., based on the video feed that is serialized). For example, the ECU 22 may analyze a frame of received data (e.g., a MIPI frame), which may indicate the number of X and Y pixels, which correspond to the resolution of the camera.

Based on the video feed being serialized according to the first LVDS standard, the ECU 22 deserializes the video feed according to the first LVDS standard (step 106).

Based on the video feed being serialized according to the second LVDS standard, the ECU 22 deserializes the video feed according to the second LVDS standard (step 108).

The method then proceeds to step 110, at which the ECU 22 performs an analysis of the video feed (step 110), and based on the analysis, the ECU 22 determines a parameter adjustment for the camera 20 to utilize for adjustment of the video feed based on the analyzing (step 112). The parameter adjustment may include one or more of an integration time adjustment, a digital gain adjustment, and a frame rate adjustment, for example. In the context of imaging, "integration time" is analogous to a shutter speed of a still photograph, and refers to the length of time the imager 50 is exposed to an image before the image is recorded.

The ECU 22 uses the communication channel 42B to transmit an instruction to the camera 20 to implement the parameter adjustment (step 114). The instruction is transmitted as part of the closed loop control architecture 40.

The analysis of step 110 may include, for example, the ECU 22 determining, based on one or more criteria, whether the video feed is underexposed or overexposed. In one or more embodiments, this includes determining one or more histograms of one or more images from the video feed, and the criteria are histogram criteria (e.g., determining whether a predefined quantity of pixels have a brightness value above an overexposure brightness threshold which is indicative of an overexposed image, or determining whether a predefined quantity of pixels have a brightness value below an underexposure brightness threshold which is indicative of an underexposed image). Pixel brightness may be assessed based on, e.g., the lumens for each pixel.

In one or more embodiments, determining the parameter adjustment in step 112 includes:

based on the analysis of step 110 indicating that the video feed is overexposed, selecting the parameter adjustment to instruct the camera 20 to do one or more of the following: reduce an integration time of the video feed, reduce a digital gain of the video feed, and increase a frame rate of the video feed; and based on the analysis of step 110 indicating that the video feed is underexposed, selecting the parameter adjustment to instruct the camera 20 to do one or more of the following: increase the integration time of the video feed, increase the digital gain of the video feed, and reduce the frame rate of the video feed.

In one or more embodiments, the ECU 22 is compatible with cameras that include IR illumination and that omit IR illumination.

The method 100 of FIG. 7A continues on FIG. 7B. Referring now to FIG. 7B, the ECU 22 determines whether the camera 20 includes an IR illumination source in step 116. In one or more embodiments, the ECU 22 performs step 116 based on the IR image data 66 that is schematically shown in FIG. 6. If the IR response does not satisfy one or more IR criteria (e.g., the IR image data 66 brightness, such as average brightness, is below a predefined threshold), the ECU 22 assumes the camera 20 does not have an IR illuminator, and conversely if the IR response does satisfy the one or more IR criteria (e.g., the IR image data 66 brightness, such as average brightness, is above a predefined threshold), the ECU 22 assumes the camera 20 includes an IR illuminator.

Based on the camera 20 including an infrared illumination source (a "yes" to step 116), the ECU 22 instructs the camera 20 to utilize the illumination source to record images at night. Based on the camera not including an infrared illumination source (a "no" to step 116), the ECU 22 instructs the camera 20 to increase a brightness of the video feed at night without reliance on an infrared illumination source for the camera. As used herein, the camera 20 "including" an IR illumination source does not require that the IR illumination source is part of the camera itself. Rather, the IR illumination source may be part of the camera arm 16, for example, as shown in FIG. 2.

It is understood that the camera 20 does not have to be an RGB-IR camera. In one or more embodiments, if the camera 20 is not an RGB-IR camera, steps 116-120 are omitted.

Although example embodiments have been disclosed, a worker of ordinary skill in this art would recognize that certain modifications would come within the scope of the claims. For that reason, the following claims should be studied to determine their true scope and content.

What is claimed is:

1. A CMS comprising:

A camera mounted to a commercial vehicle, the camera configured to provide a video feed of an external environment of the commercial vehicle; and an electronic control unit (ECU) that includes processing circuitry operatively connected to memory, the processing circuitry configured to:

receive the video feed from the camera over a wired interface, wherein the video feed is serialized;

deserialize the video feed according to a first low-voltage differential signaling (LVDS) standard based on the video feed being serialized according to the first LVDS standard;

deserialize the video feed according to a second LVDS standard based on the video feed being serialized according to the second LVDS standard;

perform an analysis of the video feed;

determine, based on the analysis, a parameter adjustment for the camera to utilize for adjustment of the video feed; and transmit an instruction to implement the parameter adjustment to the camera as part of a closed loop control architecture.

2. The CMS of claim 1, wherein the processing circuitry is configured to determining whether the camera utilizes the first LVDS standard or the second LVDS standard based on data received from the camera.

3. The CMS of claim 1, wherein the processing circuitry is configured to determining whether the camera utilizes the first LVDS standard or a second LVDS standard based on the video feed that is serialized.

4. The CMS of claim 1, wherein the first LVDS standard and the second LVDS standard are each Flat Panel Display (FPD) Link standards.

5. The CMS of claim 4, wherein:

the first LVDS standard comprises FPD-Link III; and the second LVDS standard comprises FPD-Link IV.

6. The CMS of claim 1, wherein the parameter adjustment comprises a digital gain adjustment that instructs the camera to adjust pixel intensity values of the video feed.

7. The CMS of claim 1, wherein the parameter adjustment comprises an integration time adjustment that instructs the camera to adjust an integration time of the video feed.

8. The CMS of claim 1, wherein:

the analysis includes determining, based on one or more criteria, whether the video feed is underexposed or overexposed, and the processing circuitry is configured to:

based on the analysis indicating that the video feed is overexposed, select the parameter adjustment to instruct the camera to do one or more of the following: reduce an integration time of the video feed, reduce a digital gain of the video feed, increase a frame rate of the video feed; and based on the analysis indicating that the video feed is underexposed, select the parameter adjustment to instruct the camera to do one or more of the following: increase the integration time of the video feed, increase the digital gain of the video feed, reduce the frame rate of the video feed.

9. The CMS of claim 1, wherein:

the camera is an RGB-IR camera; and the processing circuitry is configured to:

based on the camera including an infrared illumination source, instruct the camera to utilize the infrared illumination source to record images at night; and based on the camera not including an infrared illumination source, instruct the camera to increase a brightness of the video feed at night without reliance on an infrared illumination source for the camera.

10. A method for a camera monitor system (CMS), comprising:

receiving, at an electronic control unit (ECU) of a CMS, and over a wired interface, a video feed from a camera, wherein the video feed is serialized;

deserializing, by the ECU, the video feed according to a first low-voltage differential signaling (LVDS) standard based on the video feed being serialized according to the first LVDS standard;

deserializing, by the ECU, the video feed according to a second LVDS standard based on the video feed being serialized according to the second LVDS standard;

analyzing the video feed:

determining a parameter adjustment for the camera to utilize for adjustment of the video feed based on the analyzing; and transmitting an instruction to the camera to implement the parameter adjustment as part of a closed loop control architecture.

11. The method of claim 10, comprising:

determining whether the camera utilizes the first LVDS standard or the second LVDS standard based on data received from the camera.

12. The method of claim 11, comprising:

determining whether the camera utilizes the first LVDS standard or the second LVDS standard based on the video feed that is serialized.

13. The method of claim 10, wherein the first LVDS standard and the second LVDS standard are each Flat Panel Display (FPD) Link standards.

14. The method of claim 13, wherein:

the first LVDS standard comprises FPD-Link III; and the second LVDS standard comprises FPD-Link IV.

15. The method of claim 10, wherein the parameter adjustment comprises a digital gain adjustment that instructs the camera to adjust pixel intensity values of the video feed.

16. The method of claim 10, wherein the parameter adjustment comprises an integration time adjustment that instructs the camera to adjust an integration time of the video feed.

17. The method of claim 10, wherein:

the analyzing comprises determining, based on one or more criteria, whether the video feed is underexposed or overexposed, and the method includes:

based on the analyzing indicating that the video feed is overexposed, selecting the parameter adjustment to instruct the camera to do one or more of the following: reduce an integration time of the video feed, reduce a digital gain of the video feed, increase a frame rate of the video feed; and based on the analyzing indicating that the video feed is underexposed, selecting the parameter adjustment to instruct the camera to do one or more of the following: increase the integration time of the video feed, increase the digital gain of the video feed, reduce the frame rate of the video feed.

18. The method of claim 10, wherein:

the camera is an RGB-IR camera; and the method includes:

based on the camera including an infrared illumination source, instructing the camera to utilize the illumination source to record images at night; and based on the camera not including an infrared illumination source, instructing the camera to increase a brightness of the video feed at night without reliance on an infrared illumination source for the camera.

* * * * *